UNITED STATES PATENT OFFICE.

WILLIAM EDWARD CASTLE, OF CHICAGO, ILLINOIS.

PRODUCT FOR MAKING BREAD, CAKE, AND LIKE FOODS.

1,042,647.  Specification of Letters Patent.  Patented Oct. 29, 1912.

No Drawing.  Application filed January 20, 1912.  Serial No. 672,367.

*To all whom it may concern:*

Be it known that I, WILLIAM EDWARD CASTLE, a citizen of the United States, residing at Chicago, in the county of Cook and State of Illinois, have invented a new and useful Product for Making Bread, Cake, and Like Foods, of which the following is a specification.

My invention relates to a new article of manufacture used in making bread, cake or analogous farinaceous foods.

The object of my invention is to provide efficiently and economically, a prepared compound having the constituent ingredients of bread, cake or analogous farinaceous foods, so that merely by the addition of moisture followed by the ordinary operation of kneading or beating, a superior dough or batter, ready for baking, may be obtained, thus facilitating and simplifying the art of baking.

A further object is to secure accurate proportioning and thorough mixing and compounding of the constituent ingredients, yielding an evenly balanced product which, when baked, produces food of superior value.

In general, in preparing my product, I take a flour which may be of wheat, corn, rye, or other cereal or mixture thereof, and I thoroughly mix and compound therewith pulverized dried yeast, or equivalent leaven, and a yeast stimulant or food, such as the dried product of whole or skimmed milk or eggs, using appropriate mixing and compounding means to secure a smooth and uniform product.

In a preferred form, I also include a dry shortening element, such as cocoanut fat or stearin, mixing and compounding the four ingredients or constituent elements in the manner above described.

I may also, as a preliminary step, build up the nutritive deficiencies of flour ground from hard wheat, by the addition of starch elements (corn flour being itself a starch element) and of flour ground from soft wheat by the addition of gluten elements. Hard wheat flour which may have an excess of gluten elements may be blended with soft wheat flours deficient therein. I use the preliminary treatment of supplying deficiencies because I have discovered that the flour ground from different varieties of wheats require different proportions of ingredients to produce superior baking results, which proportions are based upon the analytical properties of the wheat. This variation in starch or gluten elements is especially apparent in soft and hard wheats. Corn flour deficient in gluten may be built up by blending with a hard wheat flour.

In the selection of yeast or equivalent ferment it is important that it should be thoroughly dried to insure the keeping quality of the product and to avoid premature fermentation, and that it be thoroughly assimilated in the mixture to insure proper leavening, I therefore prefer to have it pulverized.

In the selection of a yeast stimulant or food, I prefer to use as an ingredient the dried product of whole or skimmed milk or eggs or both to increase the leavening power of the yeast and to diminish the quantity of yeast necessary. It is important that the yeast food or stimulant should be thoroughly dried to insure the keeping quality of the product and to avoid premature fermentation.

In proportioning the several constituent ingredients to derive a balanced product with latent superior food values, I take about one-half to two per cent. of pulverized dried yeast and from three to five and one-half per cent. of the dried product of whole or skimmed milk or eggs or both. When adding the cocoanut fat or stearin, I prefer to use about one-half to one per cent. In some instances it may be desirable to add about one or two per cent. of seasoning, which may be sugar or salt or both. The amount of flour used is about ninety to ninety-five per cent.

The mechanical operation of mixing and compounding the constituent ingredients may be performed by apparatus well known in the milling art.

Having thus described my invention, what I claim is:

1. As a new article of manufacture, a prepared compound, ready for moistening, kneading and baking in the making of bread, cake and analogous farinaceous foods, comprising flour, pulverized dry yeast and a yeast stimulant or food in substantially the relative proportions described.

2. As a new article of manufacture, a prepared compound, ready for moistening, kneading and baking into bread, cake and analogous farinaceous foods, comprising a cereal flour, pulverized yeast and a yeast food or stimulant, all said ingredients being dry and compounded in approximately the relative proportions described.

3. As a new article of manufacture, a prepared compound, ready for moistening, kneading and baking into bread, cake and analogous farinaceous foods, composed of flour, shortening, pulverized yeast and a yeast food or stimulant, thoroughly dried and united in a uniform compound in substantially the relative proportions described.

4. As a new article of manufacture, a prepared compound comprising the dried product of milk and eggs, pulverized dry yeast and flour in substantially the relative proportions described and for the purposes set forth.

5. As a new article of manufacture, a prepared compound composed of dry shortening, the dried product of milk and eggs, pulverized dry yeast and flour in substantially the proportions described and for the purposes set forth.

6. As a new article of manufacture, a prepared compound comprising dry shortening, the dried product of milk, pulverized dry yeast and flour in substantially the proportions described and for the purposes set forth.

7. As a new article of manufacture, a prepared compound comprising the dried product of skimmed milk, pulverized dry yeast and flour in substantially the relative proportions described and for the purposes set forth.

8. As a new article of manufacture, a prepared compound, for the purposes set forth, comprising dry shortening, the dried product of skimmed milk, pulverized dry yeast and flour in substantially the proportions set forth.

9. As a new article of manufacture, a prepared compound comprising dry shortening, the dried product of milk, pulverized dry yeast, a suitable seasoning, and flour in substantially the proportions described and for the purposes set forth.

10. As a new article of manufacture, a prepared compound, for the purposes set forth, comprising dry shortening, the dried product of skimmed milk, pulverized dry yeast, a suitable seasoning and flour in substantially the proportions set forth.

In testimony whereof I hereunto affix my signature in the presence of two witnesses.

WILLIAM EDWARD CASTLE

Witnesses:
  ROBERT CATHERWOOD,
  LUCY WRIGHT.